United States Patent

Philip

[15] 3,705,266

[45] Dec. 5, 1972

[54] TELEPHONE SWITCHING SYSTEMS

[72] Inventor: Alexander Schroder Philip, Liverpool, England

[73] Assignee: Plessey Handel Und Investments A.G., Zug, Switzerland

[22] Filed: April 29, 1971

[21] Appl. No.: 138,643

[30] Foreign Application Priority Data

May 8, 1970 Great Britain .....................22,328/70

[52] U.S. Cl. ..........................179/15 AT, 179/15 AQ

[51] Int. Cl. ................................................H04j 3/00

[58] Field of Search .179/15 AQ, 18 AF, 18 GF, 18 J

[56] References Cited

UNITED STATES PATENTS

| | | | |
|---|---|---|---|
| 3,461,242 | 8/1969 | Inose | 179/15 AQ |
| 3,458,659 | 7/1969 | Sternung | 179/18 J |
| 3,236,951 | 2/1966 | Yamamoto | 179/15 AQ |
| 3,217,106 | 11/1965 | Muroga | 179/15 AQ |

FOREIGN PATENTS OR APPLICATIONS

| | | | |
|---|---|---|---|
| 41/6376 | 4/1966 | Japan | 179/15 AQ |

*Primary Examiner*—Kathleen H. Claffy
*Assistant Examiner*—David L. Stewart
*Attorney*—Scrivener, Parker, Scrivener & Clarke

[57] ABSTRACT

The proposal allows a switching center to be loaded with a combination of bothway circuit and unidirectional circuit-carrying systems with no increase in control complexity, no new switching stage(s), no frequency changing and no alteration to the super-highway format. The bothway serial highways are assembled in groups of four, as compared with the groups of eight employed in the original unidirectional-working scheme. Each bothway channel is associated with two time-slots on the parallel super-highway, one time-slot being inherently originating and the other terminating. In the receive direction the distribution of one serial channel on a highway to two parallel channels on the super-highway is accomplished at the serial-parallel converter stage. The length of each serial-parallel shift register is increased by one bit relative to the unidirectional scheme. Two sets of multiplexing gates are then associated with the output of each such shift-register, and this gating is such that if the two sets of gates are enabled in turn, at consecutive bit-times, then the complete channel contained in one shift-register appears at consecutive time-slots (one originating, one terminating) on the super-highway. In the transmit direction a complementary function is employed.

2 Claims, 3 Drawing Figures

TELEPHONE SWITCHING SYSTEMS

Figure 1A:
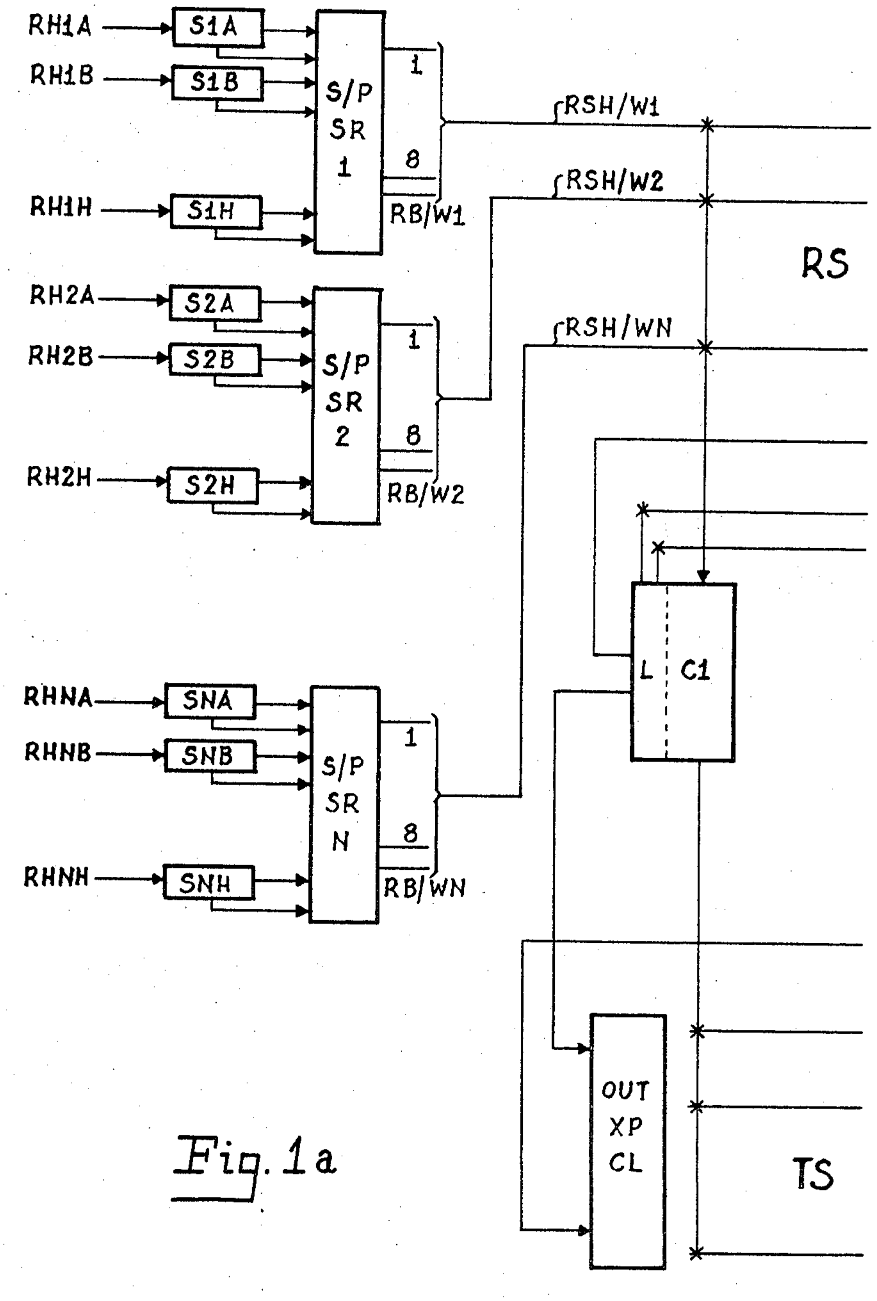

The present invention relates to telecommunication exchange systems and is more particularly concerned with such exchange systems which employ time switching techniques in association with time division multiplex transmission system arrangements.

In British Patent Specification No. 1,229,864 there is described a telephone exchange switching system for the interconnection of pulse code modulated (p.c.m.) speech channels which are transmitted over t.d.m. junctions. Exchanges of this type are not exclusively related to telephone switching and may for example be used in data or telegraph message switching environments and the term telecommunication exchange system, when used in this specification, is to be construed as relating to all such switching requirements.

The exchange system to which the invention relates consists of a number of so-called receive and transmit super-highways which are interconnected by way of a switching matrix and time switching cord circuit arrangements. Each super-highway consists of a parallel multi-bit path (for example of eight bits) and in the case of a receive super-highway it serves a group (eight in the example chosen) of time division multiplex (t.d.m.) junctions. In the case of p.c.m. t.d.m. junctions each junction carries 24 channels of eight bits per channel and the entire so formed frame is transmitted in serial form. The size of each channel (i.e. number of bits) on a junction will of course depend upon the information to be transmitted for example if the junction is used to carry data it will probably be necessary to increase the number of bits per channel and the reference to p.c.m. channels is only made by way of example.

Each super-highway is arranged to carry 192 channels in a frame (i.e. 8 ×24) in the p.c.m. case and these channels are arranged, by connection of the p.c.m. junctions via a "split and mix" arrangements and receive and transmit highways to the superhighway, to appear on the superhighways as originating and terminating channels alternately.

An originating channel is one which is used on a call which originates at the associated junction and a terminating channel is one which is used on a call which terminates at the associated junction. An originating channel on a receive highway carries "originating go" information (i.e. information transmitted from a subscriber who originated the call) whereas on a transmit highway the originating channel carries "originating return" information (i.e. information transmitted to the subscriber who originated the call). Similarly a terminating channel on a receive highway carries terminating return information (i.e. information transmitted from a subscriber to whom the call has been made) whereas that on a transmit highway carries "terminating go" information (i.e. information transmitted to the subscriber to whom the call has been made).

Each receive-superhighway is served by inlets of a first switching matrix whose outlets are each connected to the input circuit of a separate cord circuit arrangement, while a second switching matrix is provided connecting the output circuit of the cord circuit arrangements to the transmit superhighways.

Each cord circuit arrangement consists of a storage device (for example a magnetic plated wire store) having 96 storage locations (i.e. half the number of locations as there are channels on a superhighway). The cord circuit locations are addressed on a sequential (or cyclic) bases in synchronism with the appearance of originating channels on a superhighway (i.e. on alternate superhighway channel time slots) and on a random (or acyclic) basis in coincidence with the appearance of terminating channels. The cord circuit locations are, therefore, addressed twice for each frame when being used on a call once in synchronism with the originating time slot of the call and the second time in synchronism with the terminating time slot of the call.

Each cord circuit location, in addition to the section in which the channel information is stored, provides storage for (i) the address of the switch cross-points which are to be opened in the cyclic time slot (ii) the address of the cross-points which are to be opened in the next following acyclic time slot and (iii) the cord circuit location address which is to be addressed in the following acyclic time slot.

The incoming t.d.m. data (eight bits of p.c.m. information in the case of the telephone exchange application of British Patent Specification No. 1,229,864) is organized in 24 channels of which 12 are "originating go" channels while 12 are "terminating return" channels. This arrangement is ideally suited to the operation of the central cord circuits of the exchange in their cyclic/random/cyclic etc. manner of operation. As a consequence of such an arrangement, however, no more than twelve calls may be originated over each p.c.m. junction. Under certain circumstances the telephone community of interest may dictate, at say specific times of the day, that a large number of calls originate from a particular exchange while relatively few calls are destined for that exchange. At other times of the day, however, the converse situation may be encountered. It will be appreciated that the p.c.m. junctions in either case are being inefficiently used and calls may be unsuccessful due to a lack of availability of say an originating channel although there are a substantial number of free, but unusable, terminating channels.

Situations of the above type are also in considerable evidence in data switching systems where the "conversational" mode of operation is somewhat rare, most communication links being of the "one-way" type rather than the "two way" telephonic type, however, the community of interest problem still exists. Typically a situation may arise where a number of "outstation" machines require to initate the transfer of data with a central data bank at certain times of the day while at other times of the day the initiation of the data transfers may rest with the data bank alone.

From the above discussions it can be seen that the operation of time division junctions on a 12/12 type split, as far as unidirectional originating and unidirectional terminating channels is concerned, can produce undesirable constraint upon the flexibility of the overall telecommunications system. Accordingly wt is the object of the present invention to provide a telecommunications exchange system of the above mentioned type which accommodates so-called "both way" working channels on time division multiplex working junctions.

The term "bothway working" is to be construed as relating to time division multiplex transmission arrangements in which each channel may be used as either an originating or terminating channel (i.e. each channel may be seized from either end, the actual direction of transmission being always in the same direction on the receive and transmit paths).

According to the invention there is provided a time division multiplex telecommunication switching system for handling t.d.m. junctions carrying $y$ channels of $x$ bits of digital information per channel and having facilities for handling a plurality of bothway working t.d.m. junctions said switching system including (i) a plurality of $x$ bit parallel receive super-highways carrying $x.y/2$ originating channels interleaved with $x.y/2$ terminating channels (ii) a plurality of transmit super-highways carrying $x.y/2$ originating channels interleaved with $x.y/2$ terminating channels (iii) a plurality of time aligning cord circuits arranged to provide channel time alignment between selected receive and transmit super-highway channels (iv) a first switching matrix having its inlets connected to said receive super-highways and its outlets connected to said cord circuits and (v) a second switching matrix having its inlets connected to said cord circuits and its outlets connected to said transmit super-highways characterized in that said facilities include means adapted to connect a channel of a bothway working junction to one of two consecutive receive super-highway channels in accordance with each use of a channel as originating or terminating.

Figure 1B:
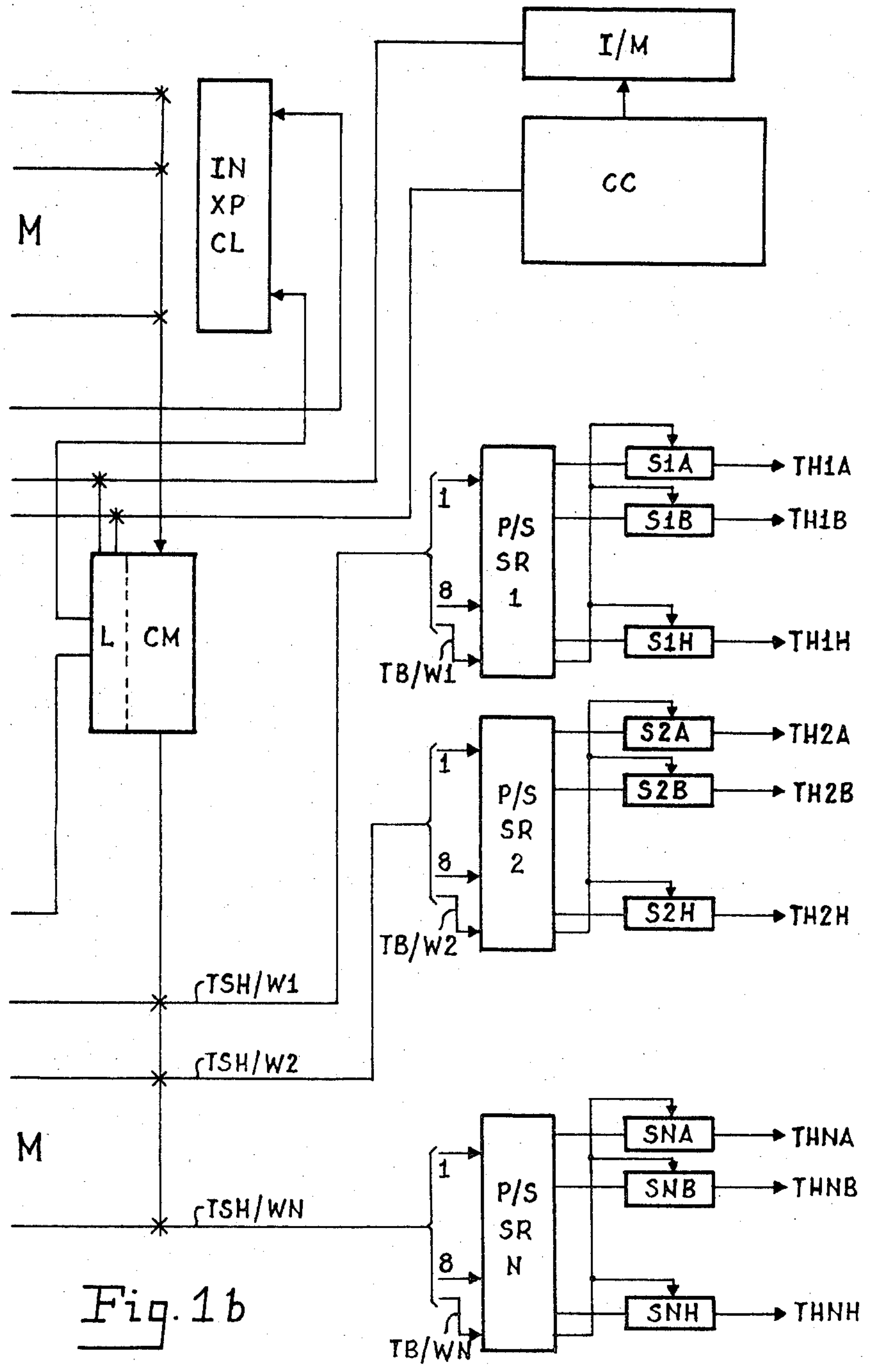
Figure 2:
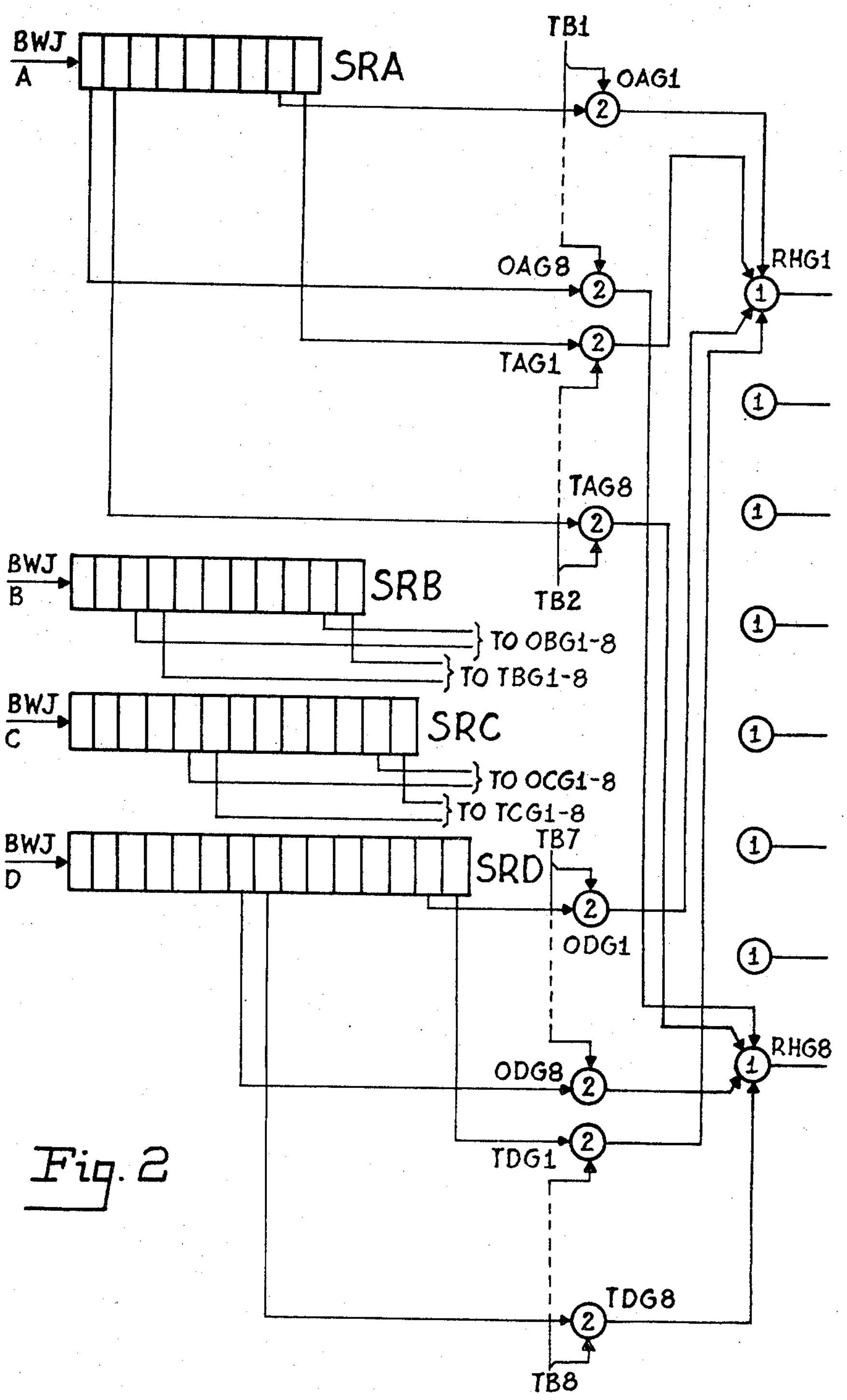

The invention, together with its various features will be more readily understood from the following description which should be read in conjunction with the accompanying drawings. Of the drawings:

FIGS. 1*a* and 1*b* show a skeletonized block diagram of an exchange to which the invention may be applied while FIG. 2 shows the equipment required to perform the invention.

Referring firstly to FIGS. 1*a* and 1*b* which should be placed side-by-side with FIG. 1*a* on the left, consideration will be given to the overall system of a typical telecommunication switching exchange to which the invention may be applied. Each time division multiplex junction terminating at the switching exchange consists of a four-wire 24-channel t.d.m. transmission system using an eight digit p.c.m. code (seven speech code bits and one signalling bit) per channel. One pair of wires conveys information to the switching exchange (the receive highway) while the other pair of wires conveys speech information from the switching exchange (the transmit highway). The systems on each pair of wires are arranged to be complementary (i.e. the same numbered channels on the receive and transmit highways form the receive and transmit paths for one channel) and are operated on a serial basis having 192 time slots in a complete frame. Further each highway is organized to carry 12 originating channels and 12 terminating channels arranged alternately. FIG. 1*a* shows the receive highways RH1A to RHNH while FIG. 1*b* shows the transmit highways TH1A to THNH.

The receive highways are fed by so-called 'split and mix' circuit arrangements (not shown) which arrange the channels on the receive highways so that receive highway so that receive highway RH1A carries all the originating channels from a pair of incoming junctions while receive highway RH1B carries the terminating channels for those junctions. Similar arrangements subsist for the remaining junctions of the group so that receive highways RH1C, RH1E and RH1G will carry 24 channels of originating go information while receive highways RH1D, RH1F and RH1H will carry 24 channels of terminating return information. Similar arrangements are provided on the transmit side of the exchange. In operation receive highways RH1A and RH1B and transmit highways TH1A and TH1B will form the receive and transmit paths for a pair of p.c.m. junctions.

Each highway is provided with a supervisory circuit, such as S1A, and this circuit handles both the receive and transmit highways. The receive highway is passed to a serial to parallel shift register arrangement, such as S/PSR1, which is common to a group of eight receive highways (RH1A to RH1H inclusive). The serial-to-parallel shift register arrangement is arranged to convert the serially received eight bits per channel into an eight bit parallel code for presentation to the associated receive super-highway, such as RSH/W1. As each serial-to-parallel shift register arrangement serves eight receive highways and each channel on a system employs eight bits, the receive super-highways are presented with the complete eight bit codes for all the associated eight systems in one channel time (i.e. successively in parallel at the bit rate). Each serial to parallel shift register arrangement may conveniently consist of eight "rows" of shift registers each row being connected on its serial input side to an individual one of the eight associated t.d.m. junctions. Each individual shift register is provided with one more stage than that immediately "above" it with the first, or uppermost, row having a total of eight stages. Hence in the case of shift register arrangement S/PSR1 junction RH1A is connected to an eight stage shift register, junction RH1B is connected to a nine stage shift register, junction RH1C is connected to a 10-stage shift register and so for junctions RH1D to RH1G while junction RH1H is connected to a sixteen stage shift register. The "top" (or most significant) eight stages of each shift register are connected, by bit time (TB) controlled AND gates, to the receive super-highway RSH/W1. These gates are known as supermultiplexing gates.

As mentioned previously each junction carries 12 originating channels (0) and 12 terminating channels (T) arranged alternately, hence each receive super-highway serves 96 originating channels and 96 terminating channels in the 192 bit times forming a complete frame. As the originating and terminating channels are arranged alternately on each system they also appear alternately on the receive super-highway. Taking receive super-highway RSH/W1 the channels will be arranged as shown in the following tables for the first and last two channel times of a frame for information on a group of eight incoming junctions (not shown) arbitrary numbered 1A to 1H.

| | Bit time (TB) | Junction Number | System Channel |
|---|---|---|---|
| | 1 | 1A | 1st(O) |
| | 2 | 1B | 1st(T) |
| | 3 | 1C | 1st(O) |
| Channel time 1 | 4 | 1D | 1st(T) |
| | 5 | 1E | 1st(O) |
| | 6 | 1F | 1st(T) |
| | 7 | 1G | 1st(O) |
| | 8 | 1H | 1st(T) |
| | 9 | 1B | 1st(O) |
| | 10 | 1A | 1st(T) |

| | | | |
|---|---|---|---|
| | 11 | 1D | 1st(O) |
| Channel time 2 | 12 | 1C | 1st(T) |
| | 13 | 1F | 1st(O) |
| | 14 | 1E | 1st(T) |
| | 15 | 1H | 1st(O) |
| | 16 | 1G | 1st(T) |
| | 177 | 1A | 12th(O) |
| | 178 | 1B | 12th(T) |
| | 179 | 1C | 12th(O) |
| Channel time 23 | 180 | 1D | 12th(T) |
| | 181 | 1E | 12th(O) |
| | 182 | 1F | 12th(T) |
| | 183 | 1G | 12th(O) |
| | 184 | 1H | 12th(T) |
| | 185 | 1B | 12th(O) |
| | 186 | 1A | 12th(T) |
| | 187 | 1D | 12th(O) |
| Channel time 24 | 188 | 1C | 12th(T) |
| | 189 | 1F | 12th(O) |
| | 190 | 1E | 12th(T) |
| | 191 | 1H | 12th(O) |
| | 192 | 1G | 12th(T) |

From the above it can be seen that alternately referenced junctions are organized to present originating information and terminating information alternately (e.g. system 1A is organized orig/term/orig and so on for the twenty four channels while system 1B is organized term/orig/term and so on for the twenty four channels). Additionally at odd numbered bit time slots "originating go" information is presented to the receive super-highway and at even numbered bit time slots "-terminating return" information is presented to the receive super-highway. These time slots are called cyclic and acyclic time slots respectively.

The receive super highways RSH/W1 to RSH/WN are presented, over a receive switching matrix consisting of nine switches per crosspoint (eight channel bits plus the busy wire) to cord circuits C1 to CM, the number of super highways provided being defined by the number of groups of eight junctions connected to the exchange while the number of cords provided in a switching exchange being dependent upon traffic calculations. Each cord circuit consists of 96 storage locations, each location providing storage for use on one call through the exchange.

Each cord location consists of storage for (i) the signalling bit, (ii) the speech bits, (iii) the cyclic crosspoint address code, (iv) the acyclic crosspoint address code, and (v) a time switching address.

When a call is set up the cord location relevant to the originating channel time slot on the receive super-highway is programmed, by the central control equipment CC, with the crosspoint addresses of the relevant super-highways involved in the connection at the cyclic and acyclic address sections of that location. Additionally a further cord location which is processed in the originating channel time slot immediately prior to that allocated to the terminating channel selected for the call, is programmed, by the common control equipment CC, with the cord location address of the above-mentioned cord location, for use in the time slot allocated to the terminating channel for use in the connection, at the time switching address section TSA. The cord locations are processed in two interleaved cycles referred to as cyclic and acyclic cycles. As mentioned previously the receive and transmit super-highways carry originating and terminating information in alternate bit time slots hence in cyclic time slots originating information is processed while in acyclic time slots terminating information is processed.

In the cyclic time slots the cord locations are processed sequentially (i.e. 1, 2, 3, etc. to 96) while in the acyclic time slots the cord locations are processed "randomly," the required location being defined each time by the time switching address of the cord location processed in the immediately prior cyclic time slot.

The following table shows the relationship between the cyclic/acyclic time slots and (1) the super-highway bit times, (2) the cord locations processed, (3) the system within a group which presents information to the cord (the actual system will be dictated by the super-highway selected by the crosspoint address), (4) the type of information and (5) the corresponding channel on the p.c.m. junctions, for the first and last two channels of a frame.

| Time slot | Cord Loc'n | Bit time | Junction | Type of inf. | Channel |
|---|---|---|---|---|---|
| CTS | 1 | 1 | A | Originating | 1 |
| ATS1 | TSA from 1 | 2 | B | Terminating | 1 |
| CTS2 | 2 | 3 | C | Originating | 1 |
| ATS2 | TSA from 2 | 4 | D | Terminating | 1 |
| CTS3 | 3 | 5 | E | Originating | 1 |
| ATS3 | TSA from 3 | 6 | F | Terminating | 1 |
| CTS4 | 4 | 7 | G | Originating | 1 |
| ATS4 | TSA from 4 | 8 | H | Terminating | 1 |
| CTS5 | 5 | 9 | B | Originating | 2 |
| ATS5 | TSA from 5 | 10 | A | Terminating | 2 |
| CTS6 | 6 | 11 | D | Originating | 2 |
| ATS6 | TSA from 6 | 12 | C | Terminating | 2 |
| CTS7 | 7 | 13 | F | Originating | 2 |
| ATS7 | TSA from 7 | 14 | E | Terminating | 2 |
| CTS8 | 8 | 15 | H | Originating | 2 |
| ATS8 | TSA from 8 | 16 | G | Terminating | 2 |
| CTS89 | 89 | 177 | A | Originating | 23 |
| ATS89 | TSA from 89 | 178 | B | Terminating | 23 |
| CTS90 | 90 | 179 | C | Originating | 23 |
| ATS90 | TSA from 90 | 180 | D | Terminating | 23 |
| CTS91 | 91 | 181 | E | Originating | 23 |
| ATS91 | TSA from 91 | 182 | F | Terminating | 23 |
| CTS92 | 92 | 183 | G | Originating | 23 |
| ATS92 | TSA from 92 | 184 | H | Terminating | 23 |
| CTS93 | 93 | 185 | B | Originating | 24 |
| ATS93 | TSA from 93 | 186 | A | Terminating | 24 |
| CTS94 | 94 | 187 | D | Originating | 24 |
| ATS94 | TSA from 94 | 188 | C | Terminating | 24 |
| CTS95 | 95 | 189 | F | Originating | 24 |
| ATS95 | TSA from 95 | 190 | E | Terminating | 24 |
| CTS96 | 96 | 191 | H | Originating | 24 |
| ATS96 | TSA from 96 | 192 | G | Terminating | 24 |

The exchange operates for each call on the principle of (i) transmitting the originating return (previously terminating return) speech information and storing the originating go speech information, in the bit time slot on a super-highway relevant to the originating channel and (ii) transmitting the terminating go (previously originating go) information and storing the terminating return information, in the bit time slot allocated to the terminating channel, using a single cord location. Access to the speech information storage section in that cord location is made twice in a single frame, once at the cyclic time slot corresponding to the originating bit time and the second time at the acyclic time slot corresponding to the terminating bit time. The second access is under the control of the time switching address stored in the cord location processed in the cyclic time slot immediately proceeding the above mentioned acyclic time slot.

Bothway-working

To accommodate "bothway working" t.d.m. junctions the both-way serial junctions are assembled or grouped in groups of four rather than the groups of eight for the undirectional working junctions described above. Additionally the bothway working junctions are applied directly to the serial to parallel conversion arrangements without the interposition of "split and mix"

arrangements. be associated with two time slots on the parallel super highways. One of the pair of time slots of course being inherently "originating" while the other is inherently "terminating" as far as the exchange is concerned.

FIG. 2 shows a block diagram of the receive equipment provided to accommodate bothway-working, the transmit side equipment will of course be similar although it obviously provides a parallel-to-serial conversion function.

The four bothway working t.d.m. junctions BWJA to BWJD are each connected to the input path of individual shift registers SRA to SRD respectively. Shift register SRA is provided with nine stages, shift register SRB is provided with 11 stages, shift register SRC is provided with 13 stages while shift register SRD is provided with 15 stages (i.e. one more stage than the corresponding odd numbered junctions are provided on non-bothway working junction groups).

Two sets of super multiplexing gates are provided for each shift register. Considering shift register SRA the two sets are gates OAG1 to OAG8 (gates OAG2 to OAG7 not being shown in FIG. 2 for ease of presentation) and gates TAG1 to TAG8 (again gates TAG2 to TAG7 are not shown). These supermultiplexing gates are conditioned by bit time pulses TB1 and TB2 respectively which from reference to the above table can be seen as inherently "orginating" and "terminating" time slots on the superhighways. Consequently each channel on the bothway junction BWJA may be used as an originating or terminating channel. Similar arrangement apply for the other bothway junctions of FIG. 2.

It must be realized however that no individual channel can ever be treated as both originating and terminating at the same time. Hence it is necessary for both of the associated time slots on the superhighway to be marked busy when either is taken into use.

The busy wire system of FIG. 1 is not shown in FIG. 2, however, it will be realized by those skilled in the art that the supervisory circuits associated with both-way working junctions may be organized to accommodate this situation.

It should also be realized that a complementary arrangement to that shown in FIG. 2 will be provided to concentrate a pair of Super highway time slots (one originating and one terminating) onto one junction for the transmit direction.

Although the invention has been described with reference to an exchange system for handling p.c.m. 24 channel junctions, it will be appreciated by those skilled in the art that the invention is applicable to any t.d.m. working junction carrying data type signals and that the 24 channel arrangement is typical only and may be extended to for example 32 channel working. Also the exchange described in outline in this specification envisages the use of a physical busy wire arrangement however so-called "stored-map" arrangements may be provided within the common control and in such a case no busy-wire arrangement is provided and the pair of associated superhighway channels must be marked busy in the map when either is taken into use.

What we claim is:

1. A time division multiplex telecommunication switching system comprising in combination:

- a plurality of first t.d.m. junctions each having $y$ channels per frame, $y/2$ being dedicated originating channels whereas $y/2$ are dedicated terminating channels, each having $x$ bits per channel,
- a plurality of receive highways arranged in groups of $x$ and operated such that the incoming channels of a pair of said first t.d.m. junctions are served by a corresponding pair of receive highways in such manner that one of the pair of highways carries $y$ originating channels whereas the other of the pair carries $y$ terminating channels,
- a plurality of bothway-working junctions arranged in groups of $x/2$ in which each bothway junction channel is usable as either an originating or terminating channel,
- a plurality of channel information duplicating means, one for each bothway working junction, arranged to generate the information content of each incoming-bothway-working junction channel in two successive exchange super-highway time slots,
- a plurality of $x$ bit parallel receive super-highways some individually serving each group of said first t.d.m. junctions and the remainder serving individually each group of bothway working junctions, each receive super-highway carrying $x.y$ channels, $x.y/2$ being originating channels interleaved with $x.y/2$ terminating channels and each super-highway channel occupies one exchange super-highway time slot,
- a plurality of time switching cord circuits arranged to provide channel alignment between interconnected t.d.m. junction channels,
- a plurality of transmit super-highways carrying $x.y/2$ originating channels interleaved with $x.y/2$ terminating channels,
- a first switching matrix having its inlets connected to said receive super-highways and its outlets connected to said cord circuits and
- a second switching matrix having its inlets connected to said cord circuits and its outlets connected to said transmit super-highways.

2. A time division multiplex telecommunication switching system as claimed in claim 1 and in which said information duplicating means includes $x/2$ shift registers, one for each bothway working junction in a group, and said shift registers are provided with $x+1, x+3, x+5 \ldots x+(x-1)$ stages respectively.

* * * * *